United States Patent [19]
Yamamoto

[11] Patent Number: 4,984,994
[45] Date of Patent: Jan. 15, 1991

[54] CARD CONNECTOR

[75] Inventor: Akira Yamamoto, Yamatotakada, Japan

[73] Assignee: Hosiden Electronics Co., Ltd., Yao, Japan

[21] Appl. No.: 435,971

[22] Filed: Nov. 14, 1989

[30] Foreign Application Priority Data

Dec. 9, 1988 [JP] Japan ............................ 63-160535[U]

[51] Int. Cl.⁵ ............................................ H01R 11/22
[52] U.S. Cl. .................................... 439/267; 235/441; 235/482
[58] Field of Search ............... 439/259, 260, 261, 262, 439/263, 264, 267, 325, 326, 327, 328; 235/441, 475, 479, 482, 483, 486

[56] References Cited

U.S. PATENT DOCUMENTS

| | | | |
|---|---|---|---|
| 4,724,310 | 2/1988 | Shimamura et al. | 439/325 X |
| 4,774,399 | 9/1988 | Fujita et al. | 235/441 |
| 4,795,897 | 1/1989 | Chalendard | 235/482 |
| 4,846,713 | 7/1989 | Matsuoka | 439/260 |

FOREIGN PATENT DOCUMENTS 3235654  3/1984  Fed. Rep. of Germany ...... 235/441

Primary Examiner—Neil Abrams
Assistant Examiner—Khiem Nguyen
Attorney, Agent, or Firm—Jones, Tullar & Cooper

[57] ABSTRACT

In the card connector disclosed by the present invention, a movable member is disposed between left- and right-hand arms (8) of a U-shape slide (8) housed in a housing (15). The movable member (15) is movable between a first position where the contacts (13) of the contact pieces (13) held by the housing are separated from a card setting position and a second position where the contacts project into the card setting position. The movable member is displaced with the movement of the slider. When a card (8) is not being inserted and the slider (8) is located in the advance position, the movable member is held at the first position above-mentioned. When the card is inserted and at least the slider reaches the retracted position, the movable member is held at the second position. When the movable member is held at the second position, the contacts come in contact with external terminals of the card.

5 Claims, 4 Drawing Sheets

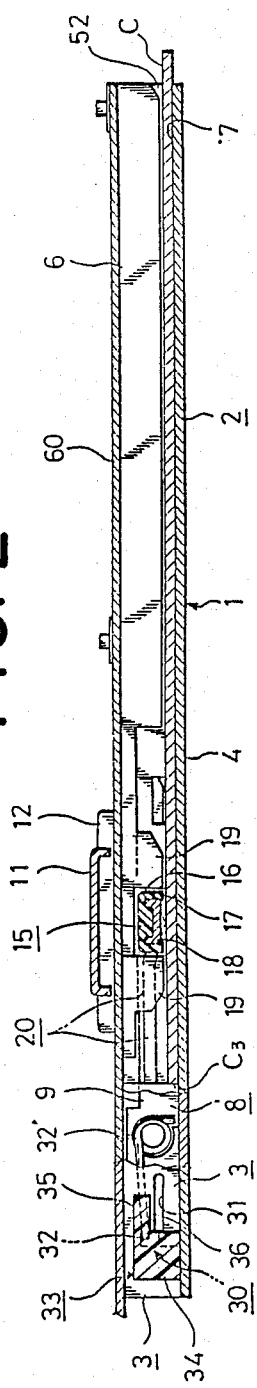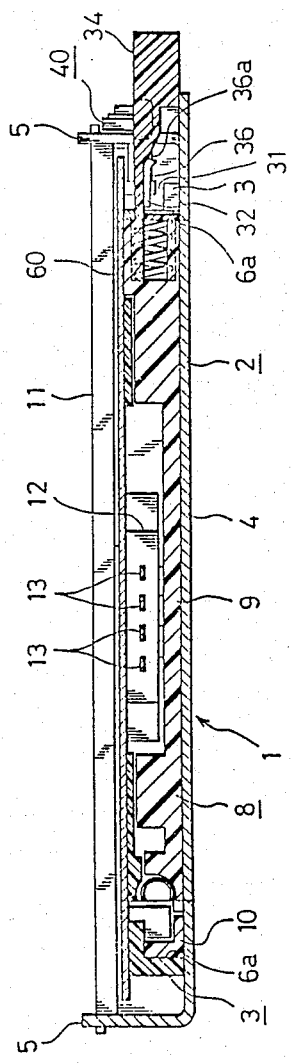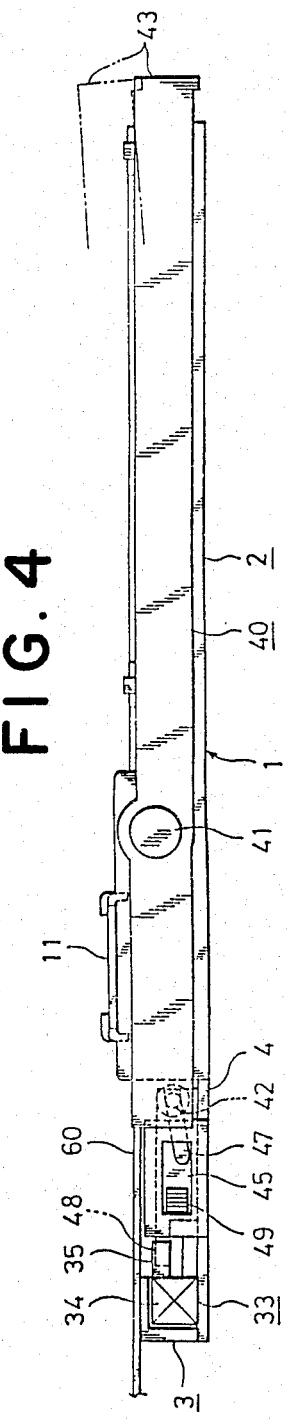

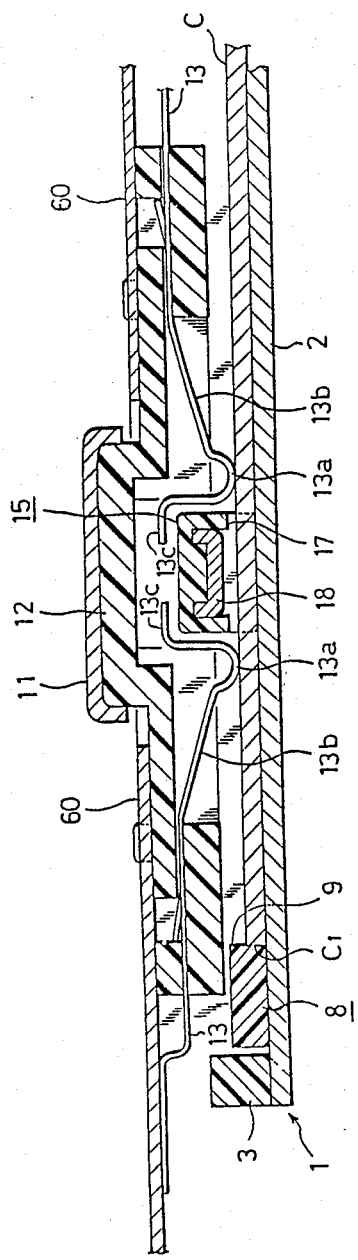
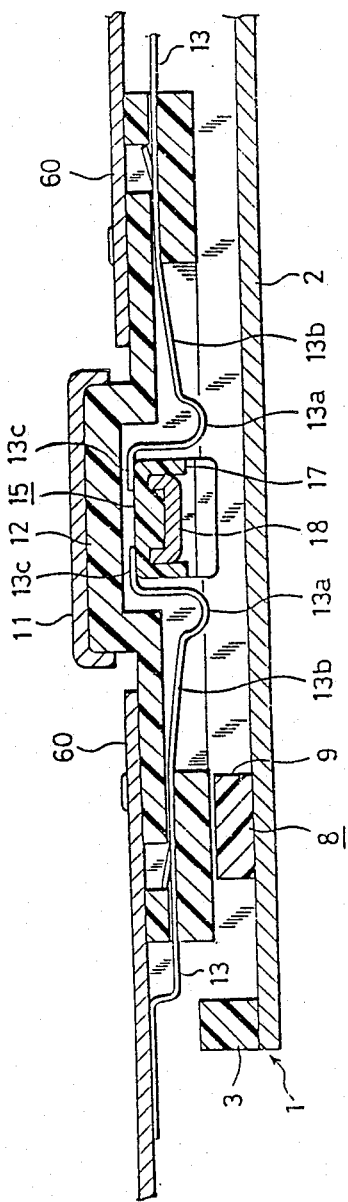

CARD CONNECTOR

BACKGROUND OF THE INVENTION

1. Field of the Invention

The present invention relates to a card connector to be used for signal communication between a card such as an IC card and apparatus such as a computer.

2. Description of the Prior Art

A card connector of the following type is known.

That is, a flat box-type housing houses a slider normally biased in an advancing direction by a spring load. When the slider is pushed to a retracted position against a spring load by a card inserted into the housing, a lock mechanism is actuated to position the slider at this retracted position. With the positioning of the slider, the card is set to a card setting position and the contacts of contact pieces come in contact with the external terminals of the card.

As means for assuring a contact pressure required for contacting the contacts of the card connector with the external terminals of the card, there is generally used the following means.

That is, the resiliency of the contact pieces causes the contacts to project to a card setting position. The contacts coming in contact with the external terminals of the set card may be raised against the resiliency of the contact pieces.

Such a card connector presents the problems that, when the card is inserted into the card setting position, the contacts rub with the top broad surface of the card, causing the contacts to be considerably worn, and that the tip of the card strikes on the contacts, causing the same to be deformed.

In view of the foregoing, there has been proposed a card connector capable of overcoming such problems.

According to this card connector, when pushing the slider into the retracted position by the card, the slider is raised, at a predetermined position, in a direction toward the contacts of the contact pieces. When the card is set or immediately before the card is set, the external terminals of the card come in contact with the contacts of the contact pieces located in the card setting position, thereby to raising the contact pieces against the resiliency thereof. This provides a required contact pressure.

The slider raising mechanism conventionally used in such a card connector has the following arrangement.

The slider has a back plate for supporting the reverse side of the card. This back plate is provided on the reverse side thereof with a concave portion which corresponds, in a predetermined positional relationship, to a raised portion formed on the housing. When the slider is located in the advance position, the concave portion is fitted in the raised portion to set the slider to a lower position. While the slider is being pushed into the retracted position, the concave portion comes out from the raised portion so that the reverse side of the back plate rides the raised portion. Thus, the slider is raised.

According to the conventional card connector having the slider raising mechanism above-mentioned, the thickness size of the connector in its entirety is determined by the thickness of the bottom plate of the housing having the raised portion, the thickness of the back plate of the slider, the slider raising height, the thickness of the contact piece housing space and the like. Thus, it is difficult to reduce the entire thickness of the connector to 8 mm or less, yet assuring the strength required for the card connector.

However, there is seen lately a requirement to minimize the thickness of the card connector. The thickness of the conventional card connector cannot be reduced to 8 mm or less, and cannot therefore, meet such a requirement.

SUMMARY OF THE INVENTION

In view of the foregoing, the present invention is proposed with the object of providing a card connector the thickness of which is reduced as compared with that of a conventional card connector, yet achieving a contact protecting function for preventing the contacts of the contact pieces from being worn or deformed, and assuring a required contact pressure.

It is another object of the present invention to provide a card connector in which the thicknesses of the portions forming a lock mechanism and a lock release mechanism for releasing the locked state of the slider provided by this lock mechanism, are also reduced.

It is a further object of the present invention to provide a card connector which achieves the objects above-mentioned, and which has a switching member for turning ON/OFF a signal communication between a card and apparatus such as a computer or the like, and which is adapted such that the card cannot be removed from the card inserting and removing port while the signal communication is being enabled by this switching member.

It is still another object of the present invention to provide a card connector adapted such that the locking state provided by the lock mechanism cannot be released while the signal communication is being enabled by the switching member.

To achieve the objects above-mentioned, the present invention provides a card connector in which the housing houses a slider normally biased in an advancing direction by a spring load, and the slider pushed into the retracted position against the spring load by a card inserted into the housing, is positioned at this retracted position by a lock mechanism.

The card connector in accordance with an embodiment of the present invention comprises:

the slider having an engagement portion with which the tip of a card inserted into the housing is adapted to engage, and a pair of left- and right-hand arms for transversely positioning the card, the slider being formed in a U-shape in plan elevation;

a support member extending between both lateral sides of the housing;

contact pieces held by the housing through the supporting member and having contacts;

a movable member disposed between both arms of the slider, and movable between a first position where the contact pieces are deformed against the resiliency thereof, causing the contacts to be separated from a card setting position, and a second position where the movable member is separated from the contact pieces, permitting the contacts to project into the card setting position; and cam mechanisms for connecting the arms of the slider to the movable member and for moving the movable member between the first position and the second position in association with the longitudinal movement of the slider.

According to the card connector having the arrangement above-mentioned, the movable member is located in the first position when the card is not being inserted. At this time, the contact pieces deformed by the movable member cause the contacts to be separated from the card setting position. When the card is inserted and the slider is pushed to the retracted position by the tip of the card, the movable member is moved from the first position to the second position in association with the movement of the slider under the action of the cam mechanism. With such a movement of the movable member, the contacts of the contact pieces liberated from the movable member come in contact with the external terminals of the card which has been set to or is about to be set to the card setting position. When the slider is advanced in order to pull out the card, the movable member is moved from the second position to the first position under the action of the cam mechanism. This causes the contact pieces to be deformed so that the contacts are separated from the card setting position.

The card connector in accordance with the present invention is operated as above-mentioned. Accordingly, the contacts may come in contact with the external terminals of the card under a required contact pressure by properly setting the resiliency of the contact pieces. Further, when the card is set or immediately before the card is set, the contacts may resiliently come in contact with the top surface or the external terminals of the card. This reduces the area where the contacts rub with the top surface or external terminals of the card, as compared with a conventional card connector. This not only reduces the wear of the contacts, but also assures self-cleaning of the contacts or the external terminals since the contacts rub with the external terminals in a limited area. Further, there is no possibility of the contacts coming in contact with the tip of the card which is being inserted. This prevents the contacts from being deformed, thus achieving a contact protecting function. Although the card connector of the present invention achieves a variety of effects as above-mentioned, the card connector does not have a conventional slider raising mechanism as above-mentioned which requires (i) the housing provided on the bottom plate thereof with the raised portion and (ii) the slider provided on the reverse side of the back plate thereof with the concaved portion. In this connection, the back plate of the slider may be eliminated according to the present invention. Thus, the thickness of the card connector in its entirety may be reduced in the total amount of the thickness of the back plate, the raising height of the raising mechanism, and the thickness of the raising members. Accordingly, the card connector may be readily reduced in thickness.

According to the card connector of the present invention, the cam mechanisms may comprise projections formed at the end surfaces of the movable member, and cam grooves which are formed in the arms of the slider and into which the projections above-mentioned are adapted to be fitted.

The cam mechanisms having the arrangement above-mentioned require no enlarged space and permit the movable member to be perfectly housed in the slider at all times. Accordingly, the card connector may be further readily reduced in thickness.

The card connector in accordance with another embodiment of the present invention comprises:

the lock mechanism including an engagement piece held, as normally spring-loaded upward, by the slider and adapted to be engaged with the rear end of the housing when the slider is forwardly moved, and guide grooves which extend from the rear end of the housing toward the front end thereof and into which the engagement piece is adapted to be fitted; and an actuator having a cam surface for restricting the upward movement of the engagement piece and for pushing the engagement piece against the spring load, causing the engagement piece to be lowered to a position where the engagement piece faces the guide groove ends.

The lock mechanism and the actuator above-mentioned may be formed rearward of the slider and within a range corresponding to the thickness of the slider.

The card connector in accordance with a further embodiment of the present invention comprises:

a communication enabling switch for turning ON/OFF a signal communication between apparatus connected to the card connector and a card inserted into the card connector;

a switching member longitudinally slidably disposed at a side of the housing and having an edge adapted to be inserted into the contacts of the communication enabling switch to open the same when the switching member is located in a forward position;

a guide groove formed in the switching member and inclined upward in the forward direction; and a swing member swingingly supported on a lateral side of the housing, and provided at one end thereof with a pin adapted to be engaged with the guide groove of the switching member and at the other end thereof with a stopper, the stopper being adapted to face the card inserting and removing port when the pin is engaged with the guide groove at the front side thereof due to the forward sliding of the switching member, and adapted to be separated from the card inserting and removing port when the pin is engaged with the guide groove at the rear side thereof.

According to the card connector having the arrangement above-mentioned, a signal communication between the apparatus and the card may be enabled only when the communication enabling switch is closed by rearwardly sliding the switching member after the card has been inserted. Further, when the switching member is slide rearwardly slided, the stopper of the swing member faces the card inserting and removing port. Accordingly, the card removal is made impossible at the same time when the signal communication is enabled. The switching member, the swing member and the communication enabling switch may be disposed without increase in the thickness of the card connector.

The card connector in accordance with a still further embodiment of the present invention comprises:

a forwardly projecting portion formed on the actuator;

a rearwardly projecting portion formed on the switching member and adapted to be engaged with the forwardly projecting portion of the actuator to prevent the actuator from being pushed when the switching member is slide rearwardly slided.

According to the card connector having the arrangement above-mentioned, there is no possibility of the lock mechanism being accidentally released after the signal communication between the apparatus and the card has been started.

Other features of the present invention will be apparent from the following description made with reference to the attached drawing.

BRIEF DESCRIPTION OF THE DRAWINGS

FIG. 2 is a section view of the card connector taken along the line II—II in FIG. 1;

FIG. 3 is a section view of the card connector taken along the line III—III in FIG. 1;

FIG. 4 is a side view of the card connector in FIG. 1;

FIG. 7 is an enlarged section view of main portions of the card connector with the movable member thereof located in a second position; and FIG. 8 is an enlarged section view of main portions of the card connector with the movable member thereof located in a first position.

DETAILED DESCRIPTION OF THE PREFERRED EMBODIMENTS

Figure 1:
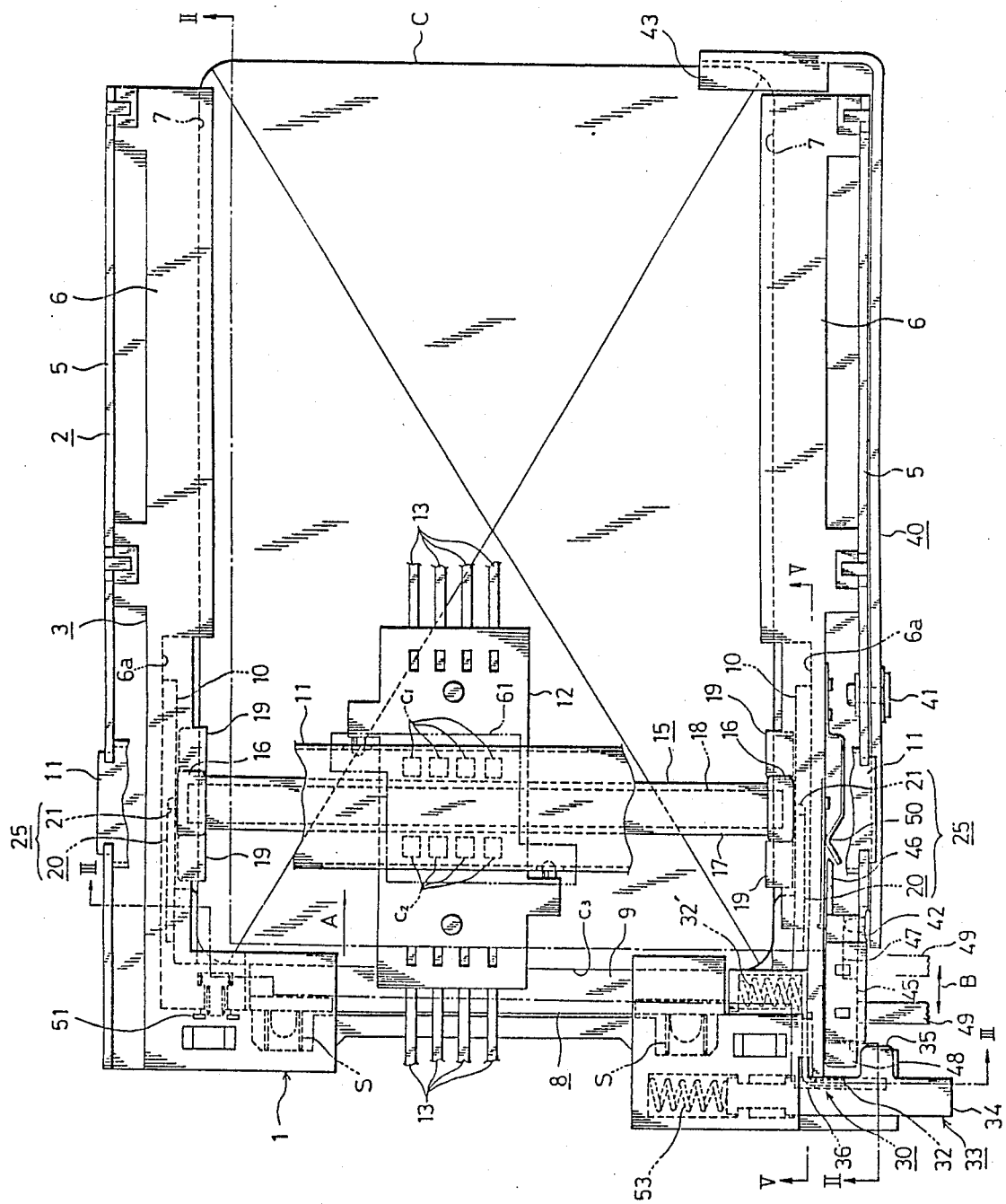
FIG. 1 is a plan view of a card connector in accordance with the present invention, illustrating the inner arrangement thereof.

FIG. 1 is a plan view of a card connector in accordance with the present invention, illustrating the inner arrangement thereof.

A housing 1 is flat and includes a metallic frame 2 and a housing body 3 made of synthetic resin secured to the frame 2. The frame 2 has a bottom plate 4 and standing portions 5 at both sides. The housing body 3 has a substantially U-shape in plan elevation. There are formed guide grooves 7 through which a card C is to be inserted and removed, the grooves 7 extending from a card inserting and removing port 52. The guide grooves 7 are formed between left- and right-hand extending portions 6 of the housing body 3 and the bottom plate 4 of the frame 2.

A slider 8 of synthetic resin housed in the housing 1 is formed by a frame having (i) an engagement portion 9 with which the card C is engaged at the tip surface $C_3$, and (ii) a pair of arms 10 for positioning the card C in the transverse direction thereof. The frame has a substantially U-shape in plan elevation. The arms 10 are adapted to be guided by the inner wall surfaces 6a of the extending portions 6. The slider 8 is movable back and forth between a retracted position shown in FIGS. 1, 2, 5 and 7, and an advance position shown in FIGS. 6 and 8. The slider 8 is normally biased in the advancing direction (shown by an arrow A in FIG. 1) by return springs S installed between the slider 8 and the housing 1.

A support member 11 extends between the standing portions 5 of the frame 2. A contact piece holding frame 12 made of synthetic resin is attached to this support member 11. The contact piece holding frame 12 holds a predetermined number of contact pieces 13. Each of the contact pieces 13 is made of a slender metallic piece having resiliency. As shown in FIGS. 7 and 8, each of the contact pieces 13 has an arcuate contact 13a, an effective spring portion 13b extending in a direction from the contact 13a toward the base side of each contact piece 13, and an engagement piece 13c extending in a direction from the contact 13a toward the tip side of each contact piece 13. In this embodiment, the contact pieces 13 are arranged in two rows which are arranged oppositely in the longitudinal direction of the card connector. The contacts 13a of the contact pieces 13 are adapted to respectively face the external terminals $C_1$ and $C_2$ of the card C in FIG. 1 which are spaced from each other in the longitudinally direction. Each of the external terminals $C_1$ and $C_2$ includes four terminals in the transverse direction. The contacts 13a are adapted to respectively face the external terminals $C_1$ and $C_2$. The number of the contact pieces 13 is determined by the number of the external terminals $C_1$ and $C_2$ of the card C. With the increase in the number of the external terminals of the card C, the number of the contacts is accordingly increased.

A movable member 15 made of synthetic resin includes a main body 17 extending between the left-hand and right-hand arms 10 of the slider 8, and follower portions 16 at both ends of the main body 17. The main body 17 is reinforced by a metallic core 18. The follower portions 16 of the movable member 15 are adapted to be vertically guided by posts 19 disposed at the right-hand and left-hand extending portions 6 of the housing body 3.

Figure 5:
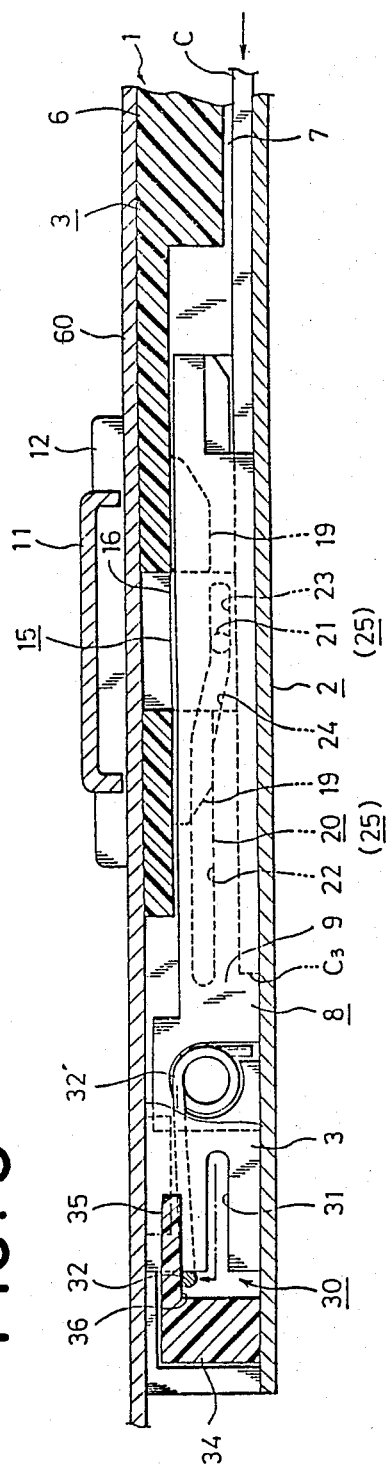
FIG. 5 is an enlarged section view of the card connector taken along the line V—V in FIG. 1.
Figure 6:
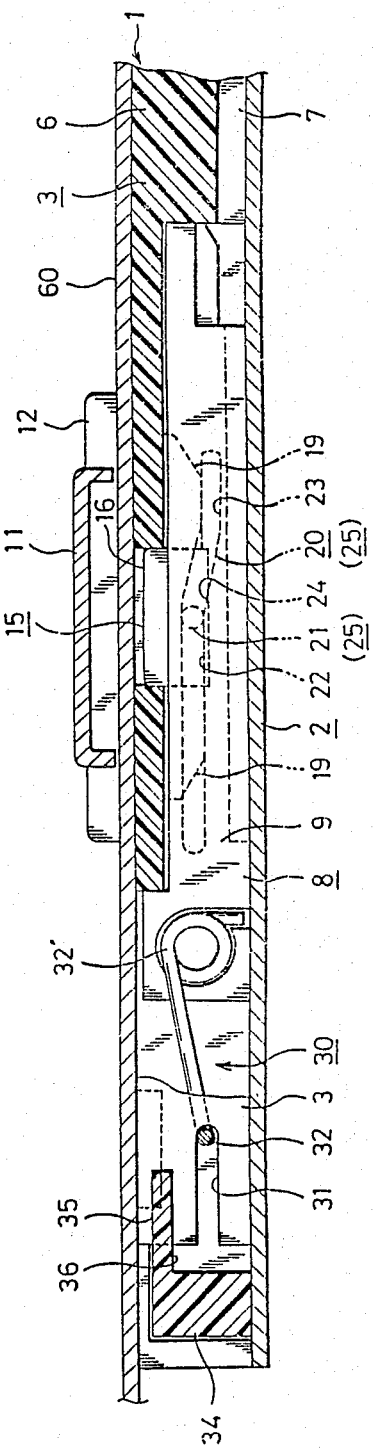
FIG. 6 is an enlarged section view of the card connector, with no card being set, at the same position as that in FIG. 5.

Cam grooves 20 are respectively formed in the arms 10 of the slider 8. Projections 21 projecting from the follower portions 16 are respectively fitted in the cam grooves 20. As shown in FIGS. 5 and 6, each of the cam grooves 20 has two horizontal portions 22, 23 having different levels, and an inclined portion 24 which smoothly connects the two horizontal portions 22, 23. The horizontal portions 22 have a level higher than that of the horizontal portions 23. Accordingly, when the slider 8 is located in the advance position, i.e., when the card C is not being set, the projections 21 are fitted in the upper horizontal portions 22 as shown in FIG. 6. This causes the movable member 15 to be moved upward and set to a first position as shown in FIG. 8. When the slider 8 is located in the retracted position, i.e., when the card C is being set, the projections 21 are fitted in the lower horizontal portions 23 as shown in FIG. 5. This causes the movable member 15 to be moved downward and set to a second position as shown in FIG. 7.

When the movable member 15 is set to the first position, the engagement pieces 13c of the contact pieces 13 are raised against the resiliency of the effective spring portions 13b by the main body 17 of the movable member 15 as shown in FIG. 8. This causes the contacts 13a to be moved upward and separated from the card setting position. When the movable member 15 is set to the second position, the main body 17 of the movable member 15 is separated from the contact pieces 13c of the contact pieces 13 as shown in FIG. 7. This allows the contacts 13a to project into the card setting position due to the resiliency of the effective spring portions 13b. In the foregoing, the cam grooves 20 and the projections 21 form cam mechanisms 25 to move the movable member 15 between the first position and the second position in association with the longitudinal movement of the slider 8. The cam mechanisms 25 connect the movable member 15 to the arms of the slider 8.

A lock mechanism 30 includes a guide groove 31 formed in the rear end of the housing body 3 and a resilient engagement piece 32 held by the slider 8. The guide groove 31 is made in the form of a transverse groove which extends forward and backward. The engagement piece 32 is formed by an extending end of a torsion coil spring 32' and normally biased upward.

A lock release mechanism 33 has a pushbutton-type actuator 34 and a projecting portion 35 disposed at the actuator 34. As shown in FIG. 1, the actuator 34 is biased by a spring 53 disposed between the housing body 3 and the actuator 34 such that the actuator 34 laterally projects. As apparent from FIGS. 2, 3, 5 and 6, the actuator 34 has a cam surface 36 formed above the opening of the guide groove 31. As shown in FIG. 3, the cam surface 36 has an inclined portion 36a. As shown in FIGS. 3 and 5, when the engagement piece 32 comes out from the guide groove 31 and engages with the rear end surface of the housing body 3, the cam surface 36 of the actuator 34 prevents the engagement piece 32 from jumping up. When the actuator 34 is pushed from this position against the spring load of the spring 53, the engagement pieces 32 are lowered by the inclined portion 36a of the cam surface 36, causing the engagement piece 32 to face the guide groove 31. With the advancement of the slider 8 by the spring loads of the return springs S, the engagement piece 32 is fitted in the guide groove 31.

A swing lever 40 swingable in forward and reverse directions is supported at the intermediate portion thereof by the frame 2 through a support shaft 41. The swing lever 40 is provided at one end thereof with a pin 42 and at the other end thereof with a card stopper 43 integral with the lever 40. The card stopper 43 is formed by a plate turned at a right angle to the swing lever 40.

A switching member 45 is disposed at a lateral side of the housing body 3 and slidable in the longitudinal direction (shown by an arrow B in FIG. 1). The switching member 45 has an edge 46 extending toward the card inserting and removing port 52, a cam groove 47 upwardly inclined toward the card inserting and removing port 52, and a projection 48 projecting in the direction opposite to the direction toward the card inserting and removing port 52, i.e., in the rearward direction. The pin 42 of the swing lever 40 is fitted in the cam groove 47. The edge 46 is opposite to the contacts of a communication enabling switch 50. It is required that the communication enabling switch 50 is set to the open position, for example, when the card C is being not set, and set to the close position after the card C has been set. The switching member 45 has an operating portion 49.

There is disposed a detector switch 51 for detecting that the card C is being set (See. FIG. 1).

The following description will discuss the operations for setting the card C.

When the card C is not being inserted (at the non-set time), the engagement piece 32 is fitted in the guide groove 31, and the slider 8 is located in the advance position by the spring loads of the return springs S as shown in FIGS. 6 and 8. The projections 21 of the movable member 15 are fitted in the upper horizontal portions 22 of the cam grooves 20 to set the movable member 15 to the first position. Accordingly, the contacts 13a of the contact pieces 13 are separated upward from the card setting position (See FIG. 8). The operating portion 49 of the switching member 45 is located in a position shown by a virtual line in FIG. 1. Accordingly, the projecting portion 48 of the switching member 45 is retracted to a position where the projecting portion 48 does not overlap the projecting portion 35 of the actuator 34, and the communication enabling switch 50 is opened by the edge 46. The pin 42 of the swing lever 40 is guided and displaced downward by the cam groove 47 of the switching member 45. This causes the swing lever 40 to be swung in the reverse direction so that the card stopper 43 is moved to a position separated from the card inserting and removing port 52 (as shown by a virtual line in FIG. 4).

From the position above-mentioned, the card C is inserted through the card inserting and removing port 52, and the tip surface $C_3$ of the card C is pushed to the engagement portion 9 of the slider 8. Subsequently, the card C is pushed in. The card C causes the slider 8 to be pushed to the retracted position against the spring loads of the return springs S as shown in FIG. 1, 3 or 5. While the slider 8 is being pushed in this manner, the projections 21 of the movable member 15 are moved in the cam grooves 20 of the slider 8 from the upper horizontal portions 22 toward the lower horizontal portions 23 through the inclined portions 24. This causes the movable member 15 to be moved from the first position to the second position. Accordingly, when the card C is set as shown in FIG. 7, the main body 17 of the movable member 15 is separated from the engagement pieces 13c of the contact pieces 13, and the resiliency of the effective spring portions 13b causes the contacts 13a to resiliently come in contact with the external terminals $C_1$ and $C_2$ of the set card C. Provision is made such that the point of time that the contacts 13a come in contact with the external terminals $C_1$ and $C_2$ of the card C, is the point of time that the card C is perfectly set or the point of time immediately before the card C is perfectly set. When provision is made such that the contacts 13a come in contact with the external terminals $C_1$ and $C_2$ immediately before the card C is perfectly set, the contacts 13a rub against the external terminals $C_1$ and $C_2$ in a limited area between the time when the contacts 13a come in contact with the external terminals $C_1$ and $C_2$, and the time when the setting of the card C is complete. This causes the contacts 13a and the external terminals $C_1$ and $C_2$ to be self-cleaned. The self-cleaning action is combined with the fact that strong contact pressures are obtained by the spring loads of the contact pieces 13, assuring a good electric conduction.

When the slider 8 is retracted, the engagement piece 32 is moved in the guide groove 31 from the position shown in FIG. 6 along a moving passage shown by a long and short dash line in FIG. 5. When the slider 8 reaches the retracted position, the engagement piece 32 comes out from the guide groove 31 and jumps upward by the spring load of the coil spring 32'. When the pushing force exerted to the card C is released at this point, the engagement piece 32 is engaged with the rear end surface of the housing body 3 by the spring loads of the return springs S. More specifically, when the slider 8 reaches the retracted position, there is provided a lock position where the slider 8 is positioned in the retracted position.

When the operating portion 49 of the switching member 45 is moved to a position shown by a solid line in FIG. 1 after the card C has been perfectly set, the edge 46 is pulled from the contact portions of the communication enabling switch 50, causing the same to be closed. Then, a signal communication is made between the card C and apparatus to which the card connector is connected. When the communication enabling switch 50 is closed, the projecting portion 48 projects to a position where the same overlaps the projecting portion 35 of the actuator 34. Accordingly, even though it is tried to push the actuator 34 during a signal communication between the card C and the apparatus, the projecting portions 48, 35 interfere with each other to prevent the actuator 34 from being pushed in. Further, the pin 42 of the swing lever 40 is guided by the cam groove 47 of the switching member 45 and moved upward as engaged with the front end side of the cam groove 47, as shown in FIG. 4. This causes the swing lever 40 to be forwardly swung so that the card stopper 43 faces the card inserting and removing port 52 (shown by the solid line in FIG. 4). Accordingly, even though it is tried to forcibly pull out the card C at this position, the card stopper 43 prevents the card C from being forcibly removed. Further, the projections 21 of the movable member 15 vertically engage with the cam grooves 20 of the slider 8. Accordingly, the movable member 15 is not vertically moved due to vibration. Therefore, this prevents the contact pieces 13 from jumping up due to vibration of the movable member 15 so that the contacts 13a are accidentally separated from the external terminals $C_1$ and $C_2$ of the card C to cut off the energization.

The following description will discuss the operation for removing the card C.

The operating portion 49 is moved from the position shown in FIGS. 1, 4, 5 and 7 to the position shown by the virtual line in FIG. 1, and the communication enabling switch 50 is opened by the edge 46. This causes the pin 42 to be moved downward as engaged with the rear end of the cam groove 47. This causes the swing lever 40 to be reversely swung, so that the card stopper 43 is separated from the card inserting and removing port 52 (as shown by the virtual line in FIG. 4). The projecting portion 48 of the switching member 45 is retracted to a position where the projecting portion 48 does not overlap the projecting portion 35 of the actuator 34. In this position, when the actuator 34 of the lock release mechanism 33 is pushed in, the engagement piece 32 engaged with the rear end of the housing body 3 is pushed down by the cam surface 36 of the actuator 34, causing the engagement piece 32 to face the guide groove 31. With the advancement of the slider 8 by the spring loads of the return springs S, the engagement piece 32 is fitted in the guide groove 31. Accordingly, the card C pushed by the slider 8 is pushed out from the card inserting and removing port 52. At the initial stage that the slider 8 advances, the projections 21 are moved in the cam grooves 20 from the lower horizontal portions 23 to the upper horizontal portions 22 through the inclined portions 24. This causes the movable member 15 to be moved upward from the lowered position in FIG. 7 to the raised position in FIG. 8. Accordingly, the engagement pieces 13c of the contact pieces 13 is pushed up so that the contacts 13a are separated upward from the card C setting position. Thus, the contacts 13a come in contact with the top surface or the external terminals $C_1$ and $C_2$ of the card C only in a narrow range.

A board 60 is mounted on the housing body 2 in FIGS. 2 to 8, and has an opening 61 as shown in FIG. 1.

According to the embodiment above-mentioned, the thickness of the card connector may be made as thin as about 5 mm, except the portion to which the support member is attached.

What is claimed is:

1. In a card connector in which a housing houses a slider normally biased in an advancing direction by a spring load, the slider being pushed to a retracted position against the spring load by a card inserted into the housing, and being positioned at the retracted position by a lock mechanism, said card connector comprising:
said slider having an engagement portion with which the tip of a card inserted into said housing is adapted to engaged, and a pair of left- and right-hand arms for transversely positioning the card, said slider being formed in a U-shaped in plan elevation;
a support member extending between both lateral sides of said housing;
contact pieces held by said housing through said supporting member and having contacts;
a movable member disposed between said arms of said slider, and movable between a first position where said contact pieces are deformed against the resiliency thereof, causing said contacts to be separated from a card setting position, and a second position where said movable member is separated from said contact pieces, permitting said contacts to project into the card setting position;
cam mechanisms for connecting said arms of said slider to said movable member and for moving said movable member between said first position and said second position in association with the longitudinal movement of each slider;
a communication enabling switch for turning ON/OFF a signal communication between apparatus connected to said card connector and a card inserted thereinto;
a switching member longitudinally slidably disposed at a lateral side of the housing, and having an edge adapted to be inserted into the contacts of said communication enabling switch to open the same when said switching member is located in a forward position;
a guide groove formed in said switching member and inclined upward in the forward direction; and
a swing member swingingly supported on a lateral side of said housing, and provided at one end thereof with a pin adapted to be engaged with said guide groove of said switching member and at the other end thereof with a stopper, said stopper being adapted to face a card inserting and removing port when said pin is engaged with said guide groove at the front side thereof due to the forward sliding of said switching member, and adapted to be separated from said card inserting and removing port when said pin is engaged with said guide groove at the rear side thereof.

2. In a card connector in which a housing houses a slider normally biased in an advancing direction by a spring load, the slider being pushed to a retracted position against the spring load by a card inserted into the housing, and being positioned at the retracted position by a lock mechanism, said card connector comprising:
said slider having an engagement portion with which the tip of a card inserted into said housing is adapted to engage, and a pair of left- and right-hand arms for transversely positioning the card, said slider being formed in a U-shaped in plan elevation;
a support member extending between both lateral sides of said housing;
contact pieces held by said housing through said supporting member and having contacts;
a movable member disposed between said arms of said slider, and movable between a first position where said contact pieces are deformed against the resiliency thereof, causing said contacts to be separated from a card setting position, and a second position where said movable member is separated from said contact pieces, permitting said contacts to project into the card setting position;

cam mechanisms for connecting said arms of said slider to said movable member and for moving said movable member between said first position and said second position in association with the longitudinal movement of said slider;

an actuator having a cam surface for restricting the upward movement of said engagement piece and for pushing said engagement piece against the spring load, causing said engagement piece to be lowered to a position where said engagement piece faces the guide groove ends;

a communication enabling switch for turning ON-/OFF a signal communication between apparatus connected to said card connector and a card inserted thereinto;

a switching member longitudinally slidably disposed at a lateral side of the housing, and having an edge adapted to be inserted into the contacts of said communication enabling switch to open the same when said switching member is located in a forward position;

a guide groove formed in said switching member and inclined upward in the forward direction; and a swing member swingingly supported on a lateral side of said housing, and provided at one end thereof with a pin adapted to be engaged with said guide groove of said switching member and at the other end thereof with a stopper, said stopper being adapted to face a card inserting and removing port when said pin is engaged with said guide groove at the front side thereof due to the forward sliding of said switching member, and adapted to be separated from said card inserting and removing port when said pin is engaged with said guide groove at the rear side thereof;

said lock mechanism including an engagement piece held, as normally spring-loaded upward, by the slider and adapted to be engaged with the rear end of the housing when said slider is forwardly moved, and guide grooves which extend from the rear end of said housing toward the front end thereof and into which said engagement piece is adapted to be fitted.

3. A card connector as set forth in claim 2, further comprising:

a forwardly projecting portion formed at the actuator;

a rearwardly projecting portion formed at the switching member and adapted to be engaged with said forwardly projecting portion of said actuator to prevent said actuator from being pushed when said switching member is rearwardly slided.

4. In a card connector in which a housing houses a slider normally biased in an advancing direction by a spring load, the slider being pushed to a retracted position against the spring load by a card inserted into the housing, and being positioned at the retracted position by a lock mechanism, said card connector comprising:

said slider having an engagement portion with which the tip of a card inserted into said housing is adapted to engage, and a pair of left- and right-hand arms for transversely positioning the card, said slider being formed in a U-shaped in plan elevation;

a support member extending between both lateral sides of said housing;

contact pieces held by said housing through said supporting member and having contacts;

a movable member disposed between said arms of said slider, and movable between a first position where said contact pieces are deformed against the resiliency thereof, causing said contacts to be separated from a card setting position, and a second position where said movable member is separated from said contact pieces, permitting said contacts to project into the card setting position;

cam mechanisms for connecting said arms of said slider to said movable member and for moving said movable member between said first position and said second position in association with the longitudinal movement of said slider;

an actuator having a cam surface for restricting the upward movement of said engagement piece and for pushing said engagement piece against the spring load, causing said engagement piece to be lowered to a position where said engagement piece faces the guide groove ends;

a communication enabling switch for turning ON-/OFF a signal communication between apparatus connected to said card connector and a card inserted thereinto;

a switching member longitudinally slidably disposed at a lateral side of the housing, and having an edge adapted to be inserted into the contacts of said communication enabling switch to open the same when said switching member is slidingly located in a forward position;

a guide groove formed in said switching member and inclined upward in the forward direction; and a swing member swingingly supported on a lateral side of said housing, and provided at one end thereof with a pin adapted to be engaged with said guide groove of said switching member and at the other end thereof with a stopper, the stopper being adapted to face a card inserting and removing port when said pin is engaged with said guide groove at the front side thereof due to the forward sliding of said switching member, and adapted to be separated from said card inserting and removing port when said pin is engaged with said guide groove at the rear side thereof, wherein:

said lock mechanism includes an engagement piece held, as normally spring-loaded upward, by the slider and adapted to be engaged with the rear end of the housing when said slider is forwardly moved, and guide grooves which extend from the rear end of said housing toward the front end thereof and into which said engagement piece is adapted to be fitted;

the cam mechanisms comprise projections formed at the end surface of the movable member, and cam grooves which are formed in the arms of the slider and into which said projection are adapted to be fitted;

the movable member is movable between the first position and the second position along guides formed in the inner wall surfaces of the housing;

the movable member is movable between the first position and the second position along guides formed in the inner wall surfaces of the housing; and when the contacts of the contact pieces are located in the first position the movable member is engaged with engagement pieces of said contact pieces formed at the side of the tips thereof with respect to said contacts, so that said contact pieces are deformed against the resiliency thereof.

5. A card connector as set forth in claim 4, further comprising:

a forwardly projecting portion formed at the actuator;

a rearwardly projecting portion formed at the switching member and adapted to be engaged with said forwardly projecting portion of said actuator to prevent the actuator from being pushed when said switching member is rearwardly slided.

* * * * *

UNITED STATES PATENT AND TRADEMARK OFFICE
CERTIFICATE OF CORRECTION

PATENT NO. : 4,984,994

DATED : January 15, 1991

INVENTOR(S) : Akira Yamamoto

It is certified that error appears in the above-identified patent and that said Letters Patent is hereby corrected as shown below:

Claim 1, column 9, line 68, "engaged" should be "engage".

Signed and Sealed this

Twenty-third Day of June, 1992

Attest:

DOUGLAS B. COMER

Attesting Officer     Acting Commissioner of Patents and Trademarks